(12) United States Patent
Bai et al.

(10) Patent No.: US 8,904,333 B2
(45) Date of Patent: Dec. 2, 2014

(54) MIXED SIGNAL IP CORE PROTOTYPING SYSTEM

(71) Applicants: Haifeng Bai, Suzhou (CN); Yin Guo, Tianjin (CN); Xuewen He, Suzhou (CN); Kun Wu, Suzhou (CN); Lei Zhang, Suzhou (CN); Shayan Zhang, Tianjin (CN)

(72) Inventors: Haifeng Bai, Suzhou (CN); Yin Guo, Tianjin (CN); Xuewen He, Suzhou (CN); Kun Wu, Suzhou (CN); Lei Zhang, Suzhou (CN); Shayan Zhang, Tianjin (CN)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 13/866,034

(22) Filed: Apr. 19, 2013

(65) Prior Publication Data

US 2014/0109029 A1 Apr. 17, 2014

(51) Int. Cl.
*G06F 17/50* (2006.01)

(52) U.S. Cl.
CPC ........ *G06F 17/5054* (2013.01); *G06F 2217/66* (2013.01)
USPC ............ 716/128; 716/112; 716/136; 716/138

(58) Field of Classification Search
USPC .................................. 716/112, 128, 136, 138
See application file for complete search history.

(56) References Cited

U.S. PATENT DOCUMENTS

| | | | | |
|---|---|---|---|---|
| 5,555,201 A * | 9/1996 | Dangelo et al. | ............... | 716/102 |
| 5,903,578 A * | 5/1999 | De et al. | ........................ | 714/726 |
| 5,968,161 A | 10/1999 | Southgate | | |
| 6,460,172 B1 | 10/2002 | Farre | | |
| 6,701,491 B1 * | 3/2004 | Yang | .............................. | 716/136 |
| 7,024,654 B2 * | 4/2006 | Bersch et al. | .................. | 716/117 |
| 7,256,610 B1 | 8/2007 | Balasubramanian | | |
| 7,262,621 B1 * | 8/2007 | Caffee et al. | ................ | 324/750.3 |
| 7,328,195 B2 * | 2/2008 | Willis | .............................. | 706/14 |
| 7,439,764 B2 * | 10/2008 | Twigg et al. | ..................... | 326/38 |
| 7,657,861 B2 * | 2/2010 | Vorbach et al. | ............... | 716/101 |
| 7,865,850 B1 * | 1/2011 | Kao et al. | ....................... | 716/136 |
| 7,937,601 B2 | 5/2011 | Bakker | | |
| 8,136,071 B2 * | 3/2012 | Solomon | ........................ | 716/119 |
| 8,258,810 B2 * | 9/2012 | Or-Bach et al. | .................. | 326/39 |
| 8,296,699 B1 * | 10/2012 | Chetput et al. | ................ | 716/106 |
| 8,316,342 B1 * | 11/2012 | Kukal et al. | .................... | 716/139 |
| 8,487,653 B2 * | 7/2013 | Tarng et al. | ...................... | 326/41 |
| 8,549,447 B2 * | 10/2013 | Eisenstadt | ...................... | 716/100 |
| 2002/0049576 A1 * | 4/2002 | Meyer | .............................. | 703/14 |
| 2003/0149962 A1 * | 8/2003 | Willis et al. | .................... | 717/135 |
| 2009/0243732 A1 * | 10/2009 | Tarng et al. | ...................... | 331/18 |
| 2012/0191400 A1 * | 7/2012 | Sontakke et al. | ............. | 702/119 |

OTHER PUBLICATIONS

Schlottmann et al.; "A Digitally Enhanced Dynamically Reconfigurable Analog Platform for Low-Power Signal Processing"; IEEE; Publication date May 30, 2012; pp. 2174-2184.*

Sree Ganesan and Ranga Vemuri, "An FPGA/FPAA-Based Rapid Prototyping Environment for Mixed Signal Systems", in Reconfigurable Technology: FPGAs for Computing and Applications, Proc. of SPIE, 1999, pp. 49-60.

Teresa Janczak et al., "A Development System for Rapid Prototyping of Dynamically Reconfigurable Mixed-Signal Low-Power Systems," University of Arizona (http://www2.engr.arizona.edu/~cmsl/Publications/Analog%20Digital%20Board/IAB_Meeting_MSDB.pdf).

* cited by examiner

*Primary Examiner* — Naum B Levin
(74) *Attorney, Agent, or Firm* — Charles Bergere (57) ABSTRACT

A system for prototyping an integrated circuit (IC) that has a mixed signal intellectual property (IP) core includes implementing the IP core using discrete programmable digital ICs and discrete analog ICs by partitioning the IP core into a digital IP portion and an analog IP portion.

15 Claims, 7 Drawing Sheets

611 ○ = ASSIGNABLE IN/OUT
612 ● = RESERVED FOR OTHER FUNCTIONS

RAW FGPA I/O

621 ○ = MUX CONTROL
622 ◎ = DIP AND/OR IIA OPTION 1
623 ◉ = DIP AND/OR IIA OPTION 2
624 ⊛ = DIP AND/OR IIA OPTION 3
612 ● = RESERVED FOR OTHER FUNCTIONS

FGPA I/O WHEN USING MULTIPLE EMBEDDED ANALOG IPs IN ONE EXT. ANALOG IC

MIXED SIGNAL IP CORE PROTOTYPING SYSTEM

BACKGROUND OF THE INVENTION

The present invention relates to integrated circuit design and, more particularly, to a system for prototyping an integrated circuit design that includes both analog and digital circuitry.

In electronic design, a mixed signal integrated circuit (IC) is an IC that has both analog and digital circuitry formed on a single semiconductor die. The separate analog and/or digital circuits may be supplied in the form of one or more intellectual property (IP) cores, also known as IP blocks or simply IPs, which are pre-designed re-usable units of, for example, logic, cells, or a chip layout design. A single IP block may be digital only, analog only, or mixed signal, including both analog and digital portions.

Mixed signal technology has enabled the design and production of System on Chip (SoC) ICs which, as their name suggests, may provide a complete processing system within a single semiconductor package, or even on a single semiconductor die.

Mixed signal SoCs can be complex to design, manufacture, test and use (i.e., develop software for use with a specific SoC), and being a relatively recent development in the world of IC design, there are limited tools to assist the IC designer/developer in verifying designs before beginning mass production, or developing the software to control and use the completed mixed signal SoC.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

The present invention provides a method of prototyping a mixed-signal integrated circuit and a system for prototyping a mixed-signal integrated circuit as described in the accompanying claims. Specific embodiments of the invention are set forth in the dependent claims. These and other aspects of the invention will be apparent from and elucidated with reference to the embodiments described hereinafter.

The illustrated embodiments of the present invention may for the most part be implemented using electronic components and circuits known to those skilled in the art. Therefore, details will not be explained in any greater extent than that considered necessary for the understanding and appreciation of the underlying concepts of the present invention and in order not to obfuscate or distract from the teachings of the present invention.

Mixed-signal Intellectual Property (IP) cores/blocks embedded in, for example, SoC chips are at higher risk of post silicon failures due to the limited scope, accuracy, and coverage of pre-silicon design models and Analog Mixed-Signal (AMS) verification tools currently available.

Furthermore, there is a lack of reconfigurable and fully accessible functional Input/Output (I/O) interface testability for mixed signal integrated circuits, particularly in stand-alone analog IP test chips, and a general lack of overall mixed-signal integrated circuit application visibility needed to prepare for and create a suitable operating system or other computer program to control or otherwise make use of the (final, mass production form of) mixed-signal integrated circuit. Moreover, debug of failures in mixed-signal integrated circuits, such as SoC chips, with embedded mix-signal IPs is usually very time consuming, and has less observability, and there is much higher cost associated with Mixed-Signal silicon revisions.

Accordingly, examples described herein provide a mixed-signal integrated circuit prototyping system to test mixed-signal IP (including related hardware and/or software) within a real customer application environment, so development of any associated operating system or customer application driven by the SoC can proceed before the final mass production version of the mixed signal integrated (e.g. SoC) is actually available. Therefore, with such a system, it is possible to test the function of mix-signal IP and develop related software before the silicon chip is available, to thereby reduce the production cycle time for the test and software development associated with mixed-signal IP.

Moreover, test results may be available sooner, and hence changes can be made to the design, as necessary, before committing to the particular SoC physical product design. As such, the prototyping system may also be used to test/verify the final design of the mixed-signal integrated system itself, prior to full mass production. Thus, examples provide means to reduce time taken to provide a final mixed-signal integrated circuit product itself, and any associated software.

Below, a method of prototyping an example mixed signal integrated circuit will be described in the context of a System on Chip (SoC), but the invention is not so limited, and may be applied to any mixed-signal integrated circuit.

In general terms the invention provides a method of prototyping an integrated circuit including at least one mixed-signal intellectual property (IP) core comprising implementing the at least one mixed-signal IP core using one or more discrete programmable digital integrated circuits and one or more discrete analog integrated circuits by partitioning the at least one mixed-signal IP core into a digital IP portion and an analog IP portion, and then implementing the digital IP portion in the one or more programmable digital integrated circuits and implementing the analog IP portion in the one or more discrete analog integrated circuits. The analog IP portion may comprise one or more analog IP blocks, each comprising a dedicated analog function (which may be implemented as a separate, external/discrete IC without in built control functionality). The partitioning of the at least one mixed-signal IP core into a digital IP portion and analog IP portion may further comprise sub-partitioning the digital IP portion into a digital control portion and an interface architecture portion. The digital control portion may take the form of digital control logic for each of the analog IP blocks.

The method may further comprise forming the digital control portion and interface architecture portion such that they are selectable and/or re-programmable while in use, for example through the use of multiplexers and control registers or by real-time re-implementation in a fully reprogrammable digital logic IC design fabric.

The digital control portion may be operable to control one or more corresponding analog IP portions, and the interface architecture portion may be operable to couple the digital control portion to the one or more corresponding analog IP portions.

The one or more discrete analog ICs may comprise multiple embedded analog IP blocks within a single external analog IC package, each analog IP block having its own associated inputs and outputs within the pin out arrangement of the single external analog IC package. The methods and system (i.e., apparatus) disclosed herein may be used to develop and test System on Chip (SoC) integrated circuit designs formed on a single semiconductor die and/or System in Package (SiP) integrated circuit designs formed from a plurality of semiconductor dies provided within a single semiconductor package.

Examples include implementations where the programmable digital integrated circuits may be formed from Field Programmable Gate Arrays, FPGAs, and/or programmable logic devices, PLDs, or any other form of reprogrammable logic fabric.

Examples of the method and systems described herein may be used to not only develop mixed signal integrated circuits, but also debug, test and develop computer program environments, such as operating systems and drivers for use with a final mass production version of any prototype proposed mixed-signal integrated circuit(s). This may involve iteratively testing and verifying operation of a proposed prototype integrated circuit and when non-desirable test and verification results occurs during a test iteration, redesigning the proposed prototype integrated circuit and re-implementing the system architecture for further re-testing and re-verification.

The described methods may further comprise converting a final fully tested and verified iterative version of the proposed prototype integrated circuit into a final mass production version as a fully integrated mixed signal System on Chip Integrated Circuit, or System in Package.

Figure 1:
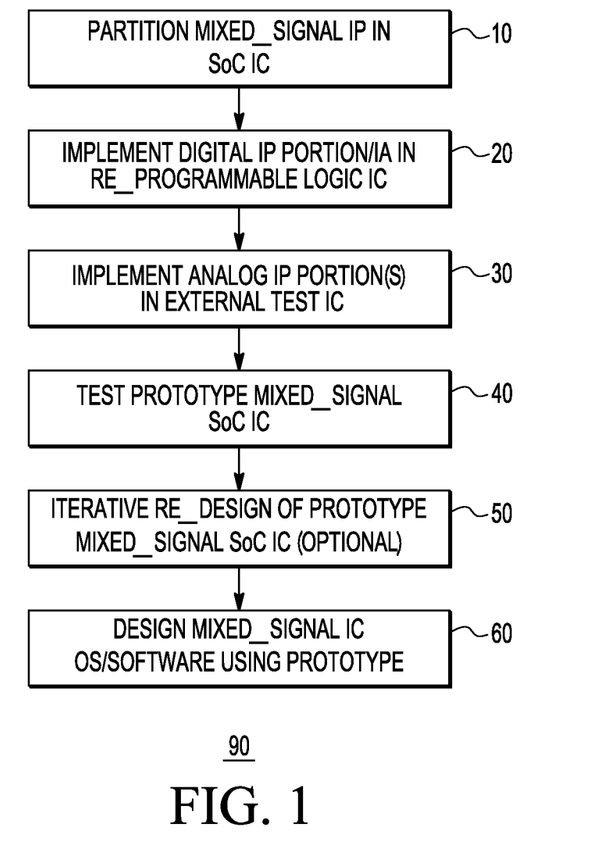
FIG. 1 shows an example of a method of prototyping a mixed-signal Integrated Circuit according to an example embodiment of the invention.

Referring now to FIG. 1, a specific example of a method 90 of prototyping a mixed-signal IC 100 is shown. The method includes partitioning the mixed-signal IP block into a digital portion (i.e., the DIP and/or IA) and analog IP portion 10, implementing the digital portion in re-programmable logic 20, and implementing the analog IP portion in an external analog test IC/chip 30. Once the respective portions (i.e., digital IP and analog IP) of a proposed design of the overall mixed-signal IC are fully implemented in the respective parts of the IC prototyping system, their operation can be tested and/or verified 40. Optionally, the testing and verification of the prototype design can lead to iterative re-design 50 (and subsequent testing and further re-design iterations), to improve upon the overall design of the SoC, tending towards a proposed final prototype design.

The result is a fully operational proposed prototype SoC IC design, ready for subsequent software development 60—i.e. the process of separately designing a suitable operating system or other software routines to enable use of the SoC.

Figure 2:
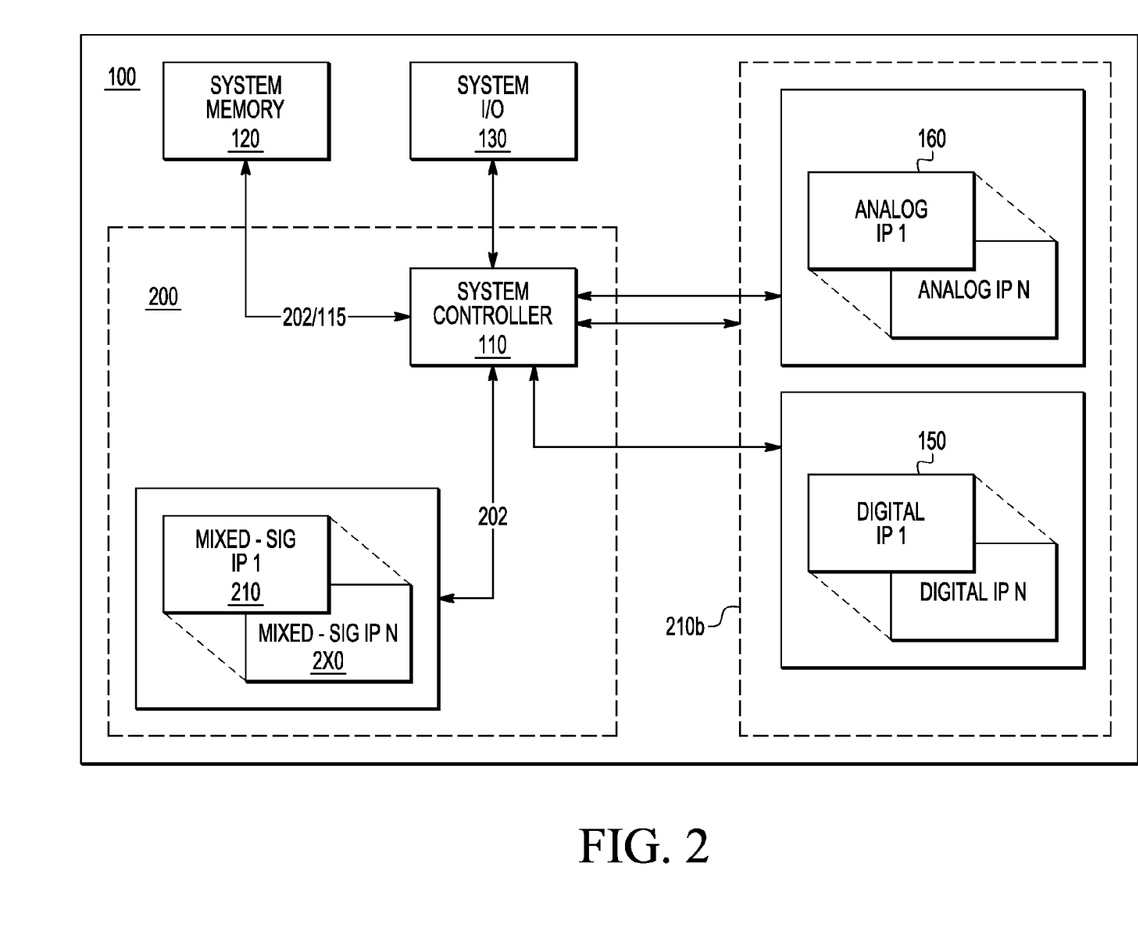
FIG. 2 schematically shows an example of a mixed-signal System on Chip Integrated Circuit architecture.

FIG. 2 shows an example SoC design 100, including a system controller (e.g. processor core) 110 operable to control the overall functionality of the SoC, including one or more of: one or more mixed-signal IP blocks (210-2X0), one or more digital IP blocks 150 and one or more analog IP blocks 160. The IP blocks may also be referred to as IP cores. The combination of one or more separate analog IP cores 160 with one or more digital IP cores 160 may themselves be referred to as an overall (aggregated) mixed-signal IP core. The invention is not limited by the number of analog, digital or mixed-signal portions used, other than by at least one mixed signal IP core being in use.

The system controller 110 may be operably coupled to each of the Analog/digital/Mixed signal IP cores present in the particular SoC design by any suitable means, such as for example, a common bus (202, as shown) or any other suitable and equivalent means (not shown), to provide control (and hence proper function) over the respective IP cores in use, and may be operably coupled to system memory 120 and/or, for example, system input/output 130, as necessary in the particular SoC design in use.

Figure 3:
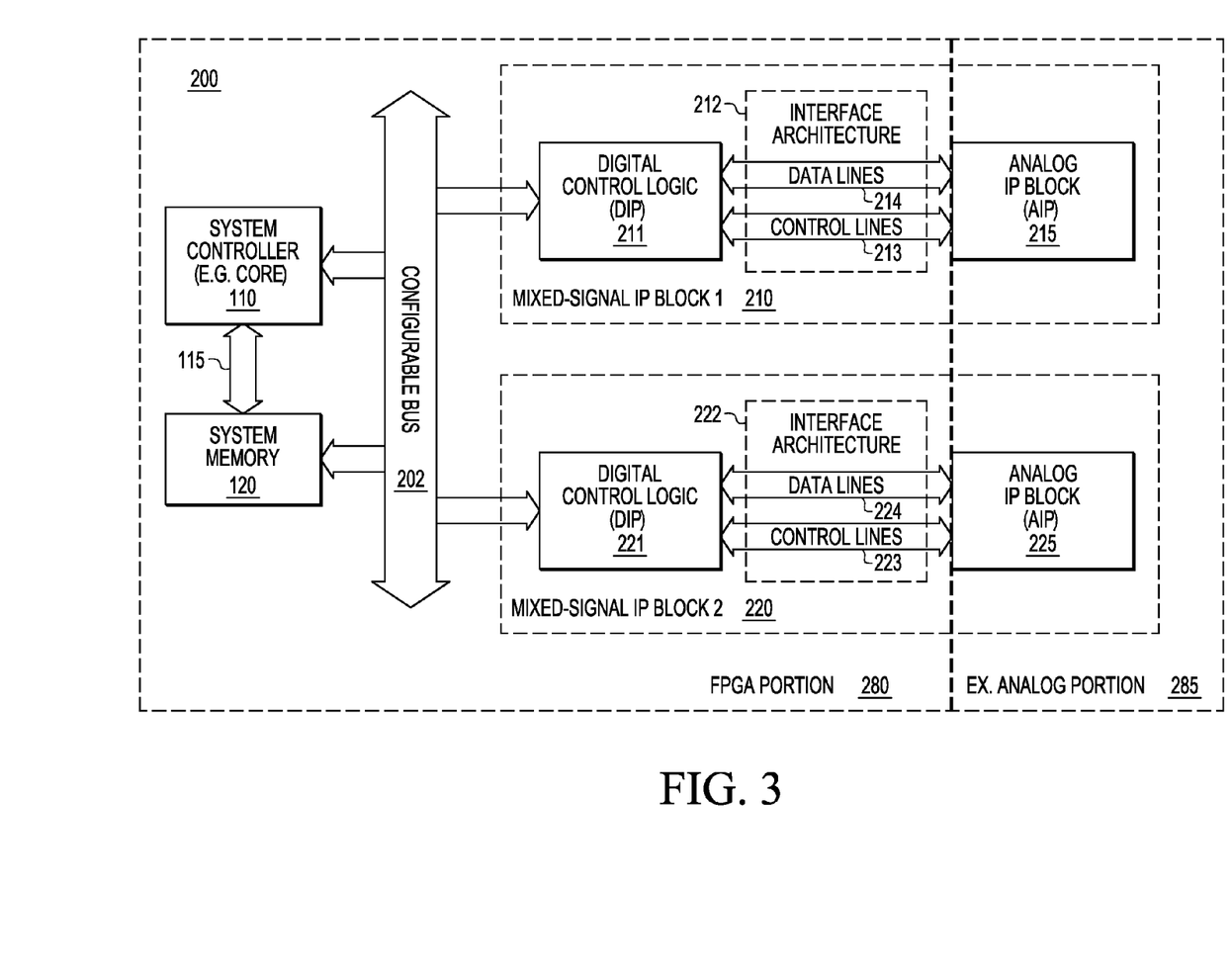
FIG. 3 schematically shows a mixed-signal portion of FIG. 1 in more detail.

The system controller 110 may also be operably coupled to the system memory using a dedicated memory bus, 115 rather than using the same common bus used to interconnect the other IP cores (see FIG. 3 for more details). The invention is not limited by the specific way in which the different parts of the final SoC are interconnected, indeed, this is a major advantage of prototyping mixed signal ICs using examples as described herein—the specific form of interconnect between the different parts is completely re-programmable to allow suitable changes to be made whilst still in testing/use.

Examples involve partitioning any relevant mix-signal portions, for example an embedded mixed signal IP block 210, into a Digital IP (DIP) portion and Analog IP (AIP) portion. This partitioning may not be necessary where the mixed signal portion being prototyped is already comprised of separate digital 150 and analog 160 IP cores. An overall single mixed-signal IP block 210 may comprise multiple instances of the (same or different) digital and analog IP portions, and any interface architectures implemented there between (see below).

After partitioning, or after simple definition of the relevant digital and analog IP portions instead, where appropriate, prototyping of an interface architecture (IA) for data and control signals for communication between the one or more Digital IP portion(s) and the one or more Analog IP portion(s) may take place. This may involve prototyping the Digital IP logic with re-programmable digital logic that is compatible and configurable with the functionality of the AIP and (a portion of, or overall) functionality of the Core/SoC where the mixed-signal embedded IP is to be instantiated. The re-programmable digital logic may be, for example, a FPGA or PLD.

The analog IP may then be implemented by using a silicon test chip separate to the FPGA, but compatible and configurable with the functionality of the prototyped DIP and IIA protocols. The silicon test chip may be located on the same test system board containing the FPGA or on a daughterboard physically separated from, but operably coupled to the re-programmable logic, such as FPGA.

FIG. 3 schematically shows an example mixed-signal portion of FIG. 2 in more detail, and is used to describe a specific implementation example of the present invention.

In FIG. 3, like in FIG. 2, a system controller 110 is operably coupled to a configurable bus 202, for onwards connection to the other portions of the overall mixed-signal IC, such as, for example, mixed-signal IP bock 1, 210, and mixed-signal IP block 2, 220. The system controller 110 may be coupled to a system memory 120 using the same configurable bus 202 (as per FIG. 2) or via one or more dedicated memory interconnect(s), such as dedicated bus 115 (of FIG. 3). Any suitable form of interconnect between the various portions of the overall mixed-signal IC may be chosen and used in examples of the present invention. Only two exemplary mixed-signal IP blocks are shown in FIG. 3, but any number may be used/present.

In the example shown, each of the two exemplary mixed-signal IP blocks, e.g., block 210, may be logically split into a digital IP (DIP) portion, such as control logic portion 211 in the example, and an analog IP (AIP) portion 215, with an Interface Architecture (IA) portion 212 comprising control lines 213 and data lines, 214, provided between the DIP and AIP. Thus, each mixed-signal IP block may be considered to be formed from a DIP portion 211, IA portion 212 and AIP portion 215.

As shown in FIG. 3, the DIP 211 and IA 212 may be implemented in the re-programmable digital logic, an FPGA in the specific example shown, as an FPGA portion 280, whilst the AIP may be implemented as a (discrete/separate) external analog test chip portion 285, comprising at least one embedded analog IP block and associated I/O.

Figure 4:
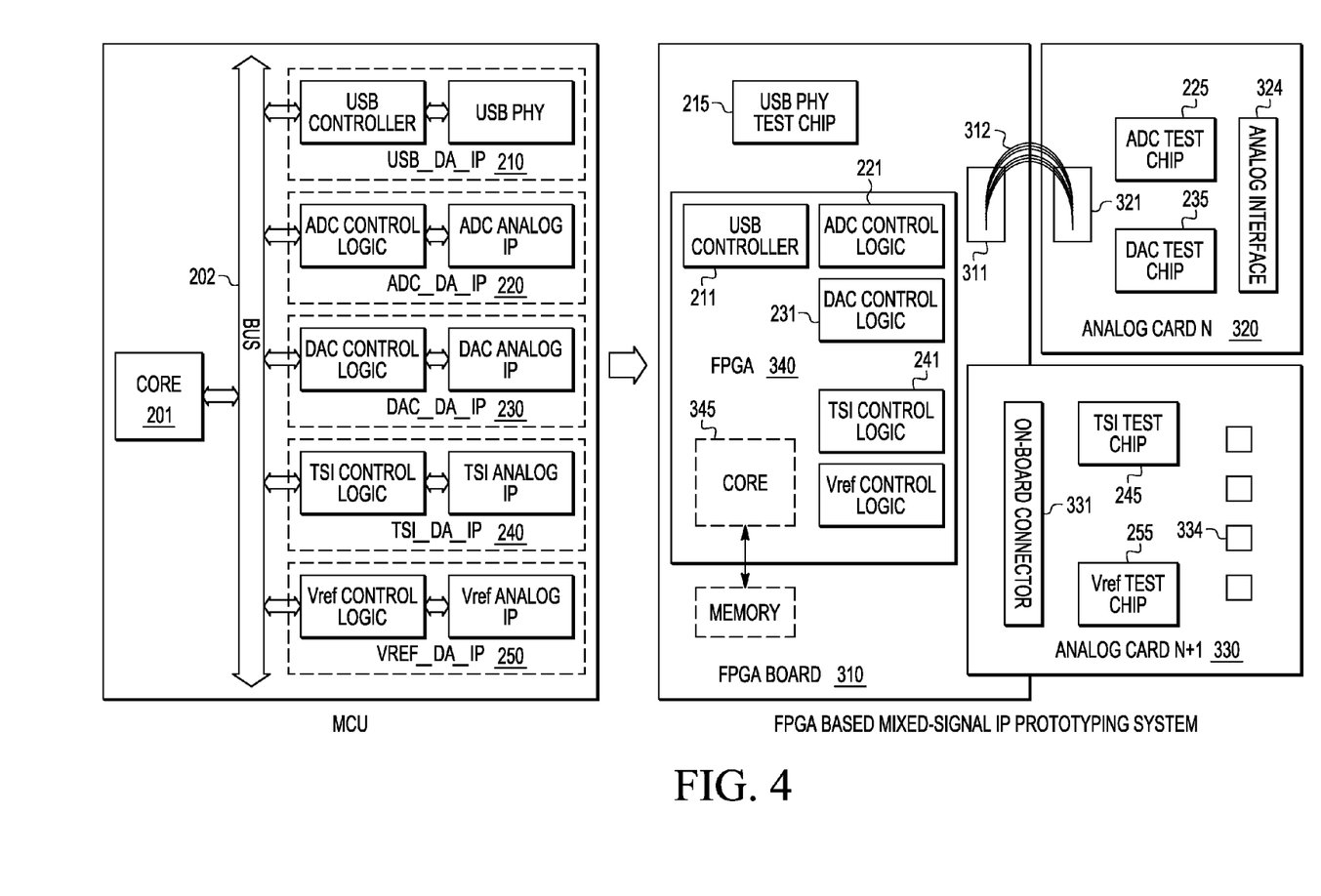
FIG. 4 shows a more detailed example of how a mixed-signal portion of a proposed mixed-signal integrated circuit may be formed from discrete analog and digital components.

FIG. 4 shows in more detail, but by way of example only, how a mixed-signal portion(s) of a proposed mixed-signal IC may be formed from a combination of discrete analog and digital components. In particular, there is shown a schematic representation of the proposed mixed-signal IC (on the left) and how it is implemented physically in the described prototyping system (on the right).

The example portion of a mixed-signal IC shown on the left hand side of FIG. 4 comprises a number of mixed-signal portions to provide each of a Universal Serial Bus (USB) circuit 210, an Analog to Digital Converter (ADC) circuit 220, a Digital to Analog Converter (DAC) circuit 230, a touch sensor interface (TSI) circuit 240 and a voltage reference (Vref) circuit 250, respectively, where each individual circuit is considered a separate mixed-signal IP block. Other examples of the invention may combine several analog functions into a single multiple function mixed-signal IP block. Each of the individual mixed-signal portions 210-250 are to be implemented in the final design as a digital IP control and interface portion, and analog IP portion.

In a physical prototype according to an example of the present invention, as shown on the left of FIG. 4, the USB circuit 210 is implemented in two portions. The first portion is a USB physical interface external test chip 215 (e.g., a single instance of an embedded analog IP block, without in built control circuitry) located on the FPGA main board, and connected to the FPGA (and rest of the prototype IC, as necessary) using suitable physical connections, such as metal traces (not shown). The second portion is implemented as digital USB controller portion 211 implemented within the FPGA 340, and a particular choice of interface architecture (not shown), to be formed within (and hence executed by) the FPGA.

The ADC and DAC are implemented as two separate external chips (an ADC chip 225 and a DAC chip 235, each comprising a single instance of an embedded analog IP block) physically located on the separate analog card 320, where the first analog card 320 is connected to the FPGA board 310 via, for example, a parallel ribbon style interface cable 312 connecting a physical connector on the FPGA board 311 and a similar physical connector 331 on the analog card 320. Each connecter 311/331 may be connected to the other components on the same board (FPGA board 310 or Analog card 310, respectively) using metal traces or the like, according to typical Printed Circuit Board (PCB) manufacturing processes.

By physically connecting a "raw" (i.e., without any associated digital control, and only routing I/O to pins of the package) embedded mixed-signal IP block contained within a separate discrete analog test chip, e.g., USB test chip 215, to a reprogrammable logic fabric, such as FPGA 340, this allows implementation of the digital control and interface architecture portions of the overall mixed-signal IP block to be implemented on the FPGA, with the analog e.g. frontend, physical portions being implemented in the embedded analog IP block.

The TSI and VREF are implemented in a similar manner to the ADC/DAC, using a second analog card 330, except, in this case, the analog test card 330 is in the form of a riser card, or mezzanine type card, physically connecting to the FPGA card as a substantially rigid back to back connector 331, instead of a ribbon style parallel connector 312.

In FIG. 4, an optional further core 345 is shown, operably coupled/connected to a system memory 120 through a dedicated external system memory interface 115. The further core (and potentially others too, not shown) may be connected to any other requisite components required for their practical use (also not shown). In some examples, the one or more further cores, e.g., core 345, may be a general purpose processor core, able to provide the one or more digital IP portions (e.g. the digital control portions 211) by running suitable program code(s). This may be used, for example, in an initial set of prototype iterations—i.e. the control may be initially implemented as a routine for a general purpose core prior to subsequent implementation in a dedicated physical formatting of the FPGA (for eventual implementation as a portion of a fully formed dedicated mixed-signal IP core within, for example, an ASIC).

A benefit of using a prototyping method and system as disclosed herein, is that multiple different forms (each potentially in the form of a distinct instance) of DIP portions and interface architectures may be provided by the FPGA, and similarly, multiple different forms of AIP portions (again, each potentially in the form of a distinct instance) may be provided in the external test chips, with selection possible between the different instances, either "on-the-fly" during testing, or in a setup phase before or between iterations. Selection may occur though use of suitable data registers in the FPGA, or the like.

Figure 5:
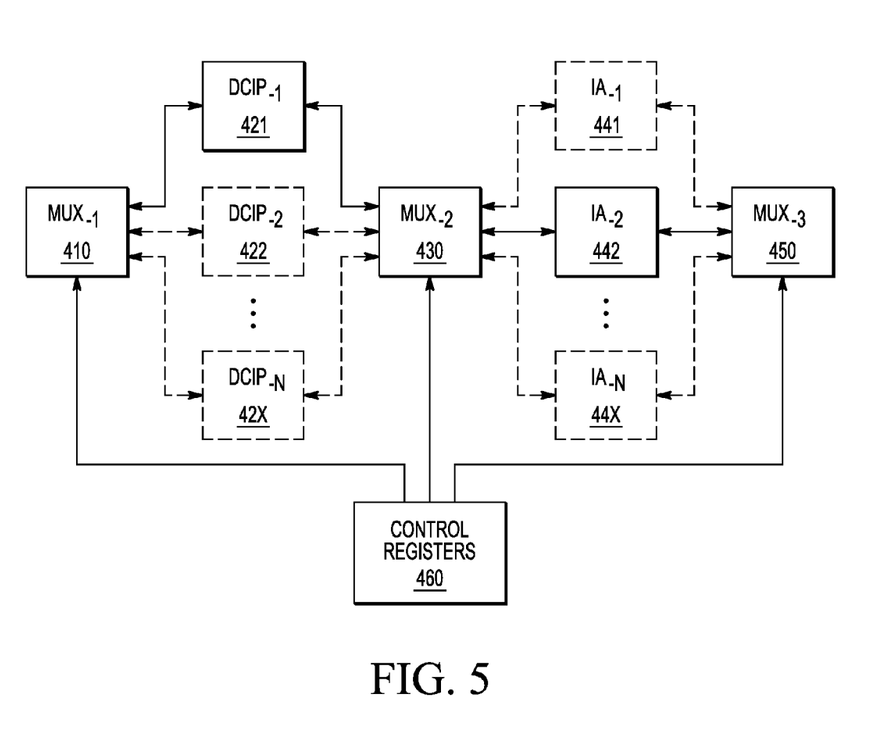
FIG. 5 shows an example of how alternative digital IP portions and interface architectures can be multiplexed, and a first selection thereof.

A high level example architecture to achieve selection of different DIP and AIP portions is shown in FIG. 5. In the example shown, selection is achieved through multiplexers operably coupled to a plurality of multiplexers. The specific form and number of multiplexers may be dependent on the specific form of FPGA and external analog IP test chips, and the invention is not intended to be limited in this respect.

In the example of FIG. 5, a first multiplexer 410 selects a Digital Control IP portion 42X for use with a particular analog IP block, which is coupled to a selected interface architecture 44X via a second multiplexer 430. The first multiplexer 410 and a third multiplexer 450 together combine to provide the requisite inputs and outputs (to/from the FPGA/external analog test chip/rest of the system at large), as required by that particular selection of Digital Control IP portion 42X and interface architecture 44X. The first 410, second 430 and third 450 multiplexers are under control (for the selection) by control registers 460. A single selection is shown as using solid lines—in the figure this is a selection of the first Digital Control IP portion 421 and the second interface architecture 442. The separate multiplexers may actually comprise a single more complicated multiplexer, or any other circuitry suitable for carrying out the operative selection.

Figure 6:
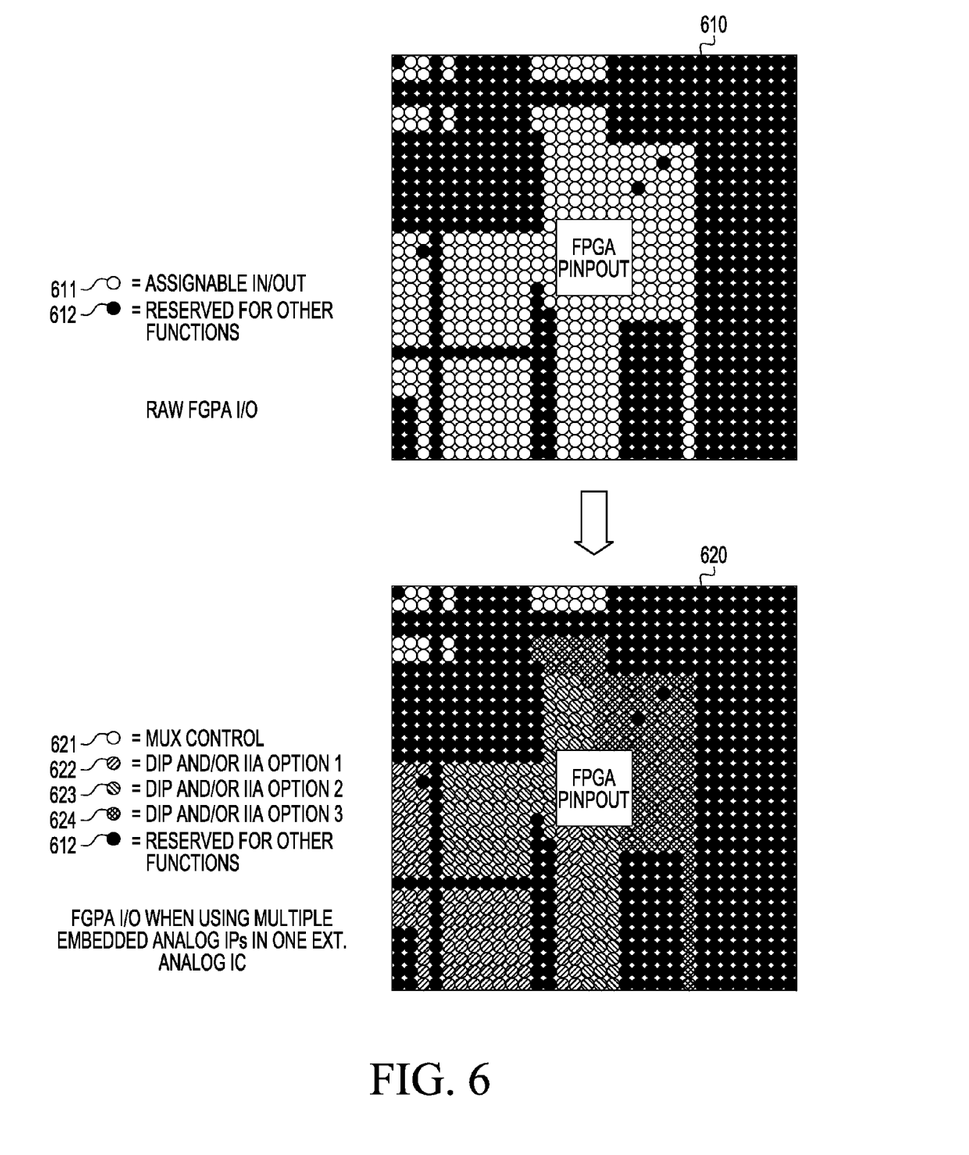
FIG. 6 shows an example of how the undefined pin out of a blank FPGA may be converted into a set of pins outs for different Digital IP/interface architectures in a suitably programmed FPGA.

FIG. 6 shows an example of how the undefined pin-out 610 of an example Ball Grid Array (BGA) physical form of blank FPGA may be converted into one or more different sets of pins outs for different Digital IP/interface architectures when the FPGA is suitably programmed.

On the right of the figure is a "raw" FPGA pin-out, i.e. before programming. This shows how any arbitrary form of FPGA may have a set of assignable inputs and outputs 611, as well as some dedicated pins 612 for reserved functions, or standard connections, such as voltage supplies and the like.

On the left of the figure is an example form of programmed FPGA pin-out, having implemented three different DIP and Interface Architectures (in this example, it is assumed that each DIP has its own dedicated form of IA, for use with a different instance of a chosen embedded analog IP block), comprising: a first DIP/IA option 622, a second DIP/IA option 623, a third DIP/IA option 624, and a set of multiplexer control pins 621, to control an external multiplexer (not shown). The reserved pin-out portions are the same in each case. Thus, as exemplified in this figure, examples of the invention may provide selection between different DIP and/or IA portions, during use, or in a setup phase portion of the prototyping method.

Figure 7:
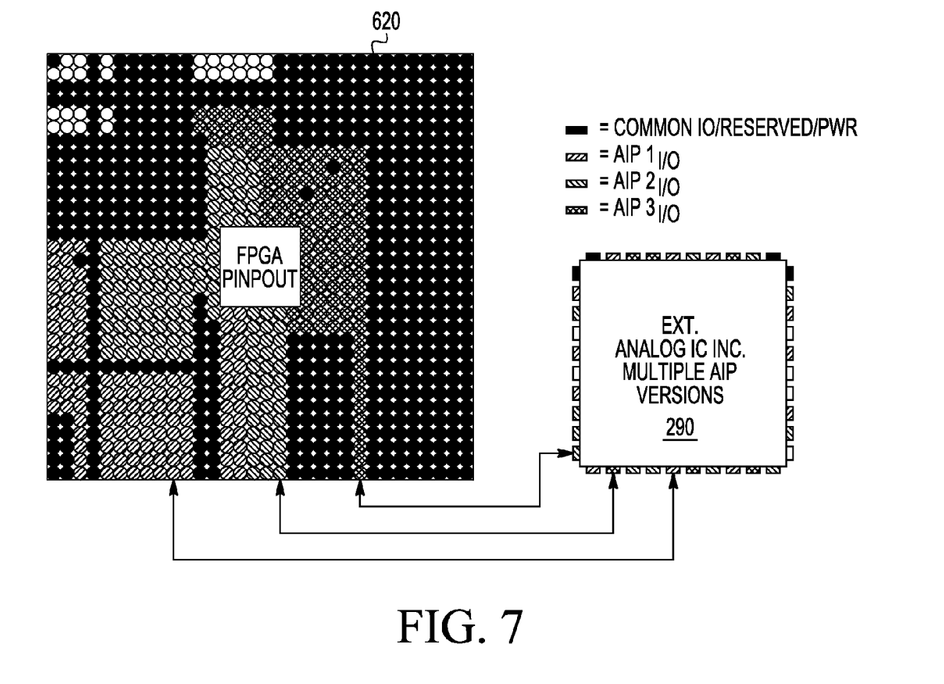
FIG. 7 shows an example of how a suitably programmed FPGA from FIG. 7 may be connected to a single external Analog IP test chip, with multiple instances of different AIP IP cores.

FIG. 7 shows an example of how a suitably programmed FPGA from FIG. 6 may be connected to a single external Analog IP test chip, with multiple instances of different AIP IP cores. In this example, the single external analog IP test chip is provided, in which there are three separate instances of the same Analog IP embedded core, but each having a different set (e.g., resistor and capacitor values, types of operational amplifiers and the like). In this very simplistic example, there is only provided outright swapping between separate combination of DIP and interface architecture. However, it will be appreciated that using techniques described herein, any arbitrary selection of different digital IP control portions and interface architecture portions may be provided. This is particularly advantageous during the initial design of the mixed-signal IC, and during the test and verification process, as by providing mixed-signal implementation alternatives in this way; most if not all of the potential design options can at least be tentatively tested in a relatively real life situation.

Figure 8:
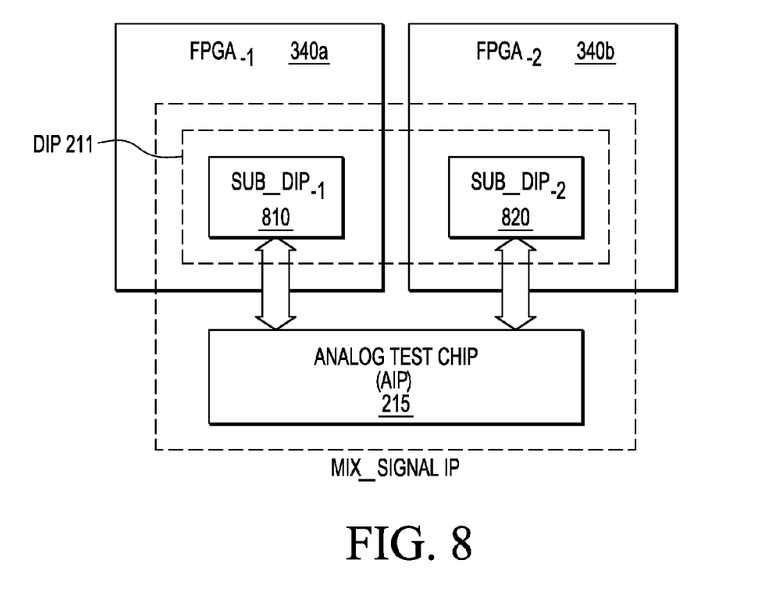
FIG. 8 shows an example of how a single Digital IP portion may be formed out of multiple sub-portions, implemented across multiple re-programmable logic ICs, such as FPGAs.

FIG. 8 shows an example of how a single digital IP portion may actually be formed out of multiple sub-portions, implemented across multiple re-programmable logic instances, such as FPGAs. In some situations, for example where a single FPGA cannot provide all the necessary resources needed for the proposed SoC design, multiple FPGAs can be used. In such an example, the DIP 211 (i.e., digital control portion and (potentially) the interface architecture portion) may be split across the multiple FPGAs—340a and 340b. This is a different form, but essentially the same process, of partitioning the digital control and interface architecture from the analog IP portion. In the example shown, there are two sub-portions, 810 and 820, each operably coupled to one another and the single analog test chip 215 though suitable form and number of physical connections, using multiplexers and the like, as described above.

Accordingly, examples of the invention may allow the integration of the DIP and Core RTLs (i.e., pre-designed embedded IP blocks) into one piece of embedded re-programmable logic (e.g., FPGA) implementation without using lots of different stand-alone digital IC parts. It may also support the use multiple FPGAs to implement the digital portions of the SoC.

In examples of the invention, the functionality of the DIP and Interface Architecture protocols may be user programmable and configurable, for example through a set of on-chip (i.e. on-die) control registers at SoC level. Accordingly, examples of the present invention provide the ability to prototype and test a mixed-signal IC, such as SoC, at the mixed-signal IC/SoC level in order to allow proper testing of any mix-signal IP used in the final design, before final mass-production occurs, and hence before final silicon is actually available. This may be done, for example, by using an external (i.e., "off-chip") implementation of an embedded analog IP core design, to provide an external test chip to implement "on-chip" analog parts, for use with a suitably programmed re-programmable logic, such as FPGA, so that SoC development and test, and related software development and test can proceed sooner in the IC design cycle.

An example prototype development system has the FPGA chip mounted on one test board (e.g. motherboard) and the analog circuit test chips mounted on one or more test boards (e.g., daughter board or card). The interconnection between the FPGA board and the analog device card may be a standard interface or a fully user configurable interface implemented in the FPGA, which supports connection to one or more of a series of dedicated analog cards.

Configurable, programmable, and reusable Control Logic functions for an analog IP test chip (e.g., ADC or DAC) may be implemented in one or several FPGA chips. Examples of the invention allow an IC designer to separate one or more instances of a mixed-signal IP block implementation into a respective Digital IP portion and Analog IP portion, not only based on the intended functionality but also on the mixed-signal IC design's intended internal/external interface architecture. All of the analog IP digital control logic (DIP) and associated interface architecture, including control or data interfaces, are configurable during use, for example, the bus architecture in use between an IP core and any related control logic.

The described methods may comprise partitioning a mixed-signal IP design into control logic and analog circuit parts, implementing the digital control logic in re-programmable logic, such as FPGA and implementing the analog function using bespoke external analog test chips (either of original design, or a choice of pre-made "library" embedded analog designs), and prototyping a customized interface between the DIP and AIP within a proposed mixed-signal IP core. An IC designer may therefore use the disclosed method and apparatus/system to develop and related digital and/or analog software, or validate the function of a proposed SoC as a whole, including both the digital and analog parts.

Examples of the invention may use different kinds or instances of analog test chips (with different choices of or configurations of embedded analog IP blocks) to test the respective features of the different analog IP block available. Examples of the invention may implement different controlling logic (DIP) or interface architecture connected to the same analog test chip, or different analog test chips.

Examples of the invention may teach a complete FPGA chip design, to be used together with embedded analog IP hardware blocks implemented in external discrete packages, with a fixed analog logic function but configurable interface protocols in use between a core and the analog IPs.

The invention may also be implemented as a computer program for running on a computer system, at least including executable code portions for performing steps of any method according to embodiments the invention when run on a programmable apparatus, such as a computer system or enabling a programmable apparatus to perform functions of a device or system according to embodiments the invention.

A computer program may be formed of a list of executable instructions such as a particular application program and/or an operating system. The computer program may for example include one or more of: a subroutine, a function, a procedure, an object method, an object implementation, an executable application, an applet, a servlet, a source code, an object code, a shared library/dynamic load library and/or other sequence of instructions designed for execution on a suitable computer system.

The computer program may be stored internally on a computer readable storage medium or transmitted to the computer system via a computer readable transmission medium. All or some of the computer program may be provided on computer readable media permanently, removably or remotely coupled to the programmable apparatus, such as an information processing system. The computer readable media may include, for example and without limitation, any one or more of the following: magnetic storage media including disk and tape storage media; optical storage media such as compact disk media (e.g., CD-ROM, CD-R, etc.) digital video disk storage media (DVD, DVD-R, DVD-RW, etc.) or high density optical media; non-volatile memory storage media including semiconductor-based memory units such as FLASH memory, EEPROM, EPROM, ROM; ferromagnetic digital memories; MRAM; volatile storage media including registers, buffers or caches, main memory, RAM, DRAM, DDR RAM, etc.; and data transmission media including computer networks, point-to-point telecommunication equipment, and carrier wave transmission media, and the like. Embodiments of the invention are not limited to the form of computer readable media used.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals. Further, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single IC or within a same device. For example, in the form of a single FPGA or PLD. Alternatively, the examples may be implemented as any number of separate ICs or separate devices interconnected with each other in a suitable manner. For example, a System in Package incorporating an FPGA and one or more of the analog IP circuits. The examples, or portions thereof, may implemented as soft or code representations of physical circuitry or of logical representations convertible into physical circuitry, such as in a hardware description language of any appropriate type.

The specification and drawings are to be regarded as illustrative rather than restrictive. In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

Unless otherwise stated as incompatible, or the physics or otherwise of the embodiments prevent such a combination, the features of the following claims may be integrated together in any suitable and beneficial arrangement. This is to say that the combination of features is not limited by the specific form of claims below, particularly the form of the dependent claims, as such a selection may be driven by claim rules in respective jurisdictions rather than actual intended physical limitation(s) on claim combinations.

The invention claimed is:

1. An integrated, mixed-signal system, comprising:
one or more re-programmable digital logic integrated circuits; and
an analog IP package portion comprising one or more discrete analog integrated circuits operably coupled to the one or more programmable digital integrated circuits;
wherein the one or more discrete analog integrated circuits each comprise at least one analog IP block;
wherein the one or more re-programmable digital logic integrated circuits comprises:
a digital IP portion comprising:
a digital control portion for controlling a functionality of the at least one analog IP block, wherein the digital control portion controls one or more corresponding analog IP package portions; and
a configurable interface architecture portion for communication between the at least one analog IP block and the digital control portion, wherein the configurable interface architecture portion couples a corresponding digital control portion to a corresponding analog IP package portion, and wherein the configurable interface architecture portion defines different types and/or number of input/output (I/O) pins between the digital IP portion and the one or more analog IP package portions.

2. The system of claim 1, wherein the digital control portion and configurable interface architecture portion are arranged to be selectable and/or re-programmable while in use.

3. The system of claim 1, further comprising:
multiplexers operatively coupled between the digital IP portion and analog IP package portion; and
control registers;
wherein the digital control portion and configurable interface architecture portion are selectable and/or re-programmable through the use of the control registers.

4. The system of claim 1, wherein the one or more discrete analog integrated circuits comprise multiple embedded analog IP blocks within a single external analog IC package, each with associated inputs and outputs with different pin out on the external analog IC package.

5. The system of claim 1, wherein the integrated, mixed-signal system is one of a System on Chip (SoC) integrated circuit formed on a single semiconductor die, at least one analog IP block chip, and part of a System in Package (SiP) formed from a plurality of semiconductor dies provided within a single semiconductor package.

6. The system of claim 1, wherein any one of the one or more programmable digital integrated circuits are re-programmable digital logic circuits, including Field Programmable Gate Arrays, FPGAs, and/or programmable logic devices, PLDs.

7. The system of claim 1, wherein the digital IP portion is formed from two or more sub-portions implemented on different ones of at least two discrete programmable digital integrated circuits.

8. A method of implementing an integrated, mixed signal system including at least one mixed-signal intellectual property (IP) core, the method comprising:
implementing the at least one mixed-signal IP core using one or more discrete programmable digital integrated circuits and one or more discrete analog integrated circuits by:
partitioning the at least one mixed-signal IP core into a digital IP portion and an analog IP package portion;
implementing the digital IP portion in the one or more programmable digital integrated circuits;
implementing the analog IP package portion in the one or more discrete analog integrated circuits;
providing a selectable interface architecture portion for communication between the digital IP portion and the analog IP package portion; and
sub-partitioning the digital IP portion into a digital control portion and the selectable interface architecture portion, wherein the selectable interface architecture portion carries control signals and data signals between the digital IP portion and the one or more analog IP package portions, and wherein each of the one or more discrete analog integrated circuits comprises at least one embedded analog IP block and associated inputs and outputs on a single external analog IC package.

9. The method of claim 8, further comprising forming the digital control portion and selectable interface architecture portion to be at least one of selectable and re-programmable while in use, wherein the selectable interface architecture portion further comprising defining different types and/or number of input/output (I/O) pins between the digital control portion and the one or more analog IP package portions.

10. The method of claim 9, wherein the digital control portion and selectable interface architecture portion are selectable and re-programmable through the use of at least one of control registers and real-time re-implementation in a fully reprogrammable digital logic IC design fabric.

11. The method of claim 9, wherein the digital control portion is operable to control one or more corresponding analog IP package portions, and the selectable interface architecture portion is operable to couple the digital control portion to the one or more corresponding analog IP package portions.

12. The method of claim 9, further comprising developing an operating system environment for use with a final mass production version of the integrated, mixed signal system using a resultant prototype integrated circuit formed of discrete digital and analog integrated circuits.

13. The method of claim 9, further comprising:
iteratively testing and verifying operation of a proposed prototype integrated circuit, and redesigning the proposed prototype integrated circuit and re-implementing the integrated system architecture for further re-testing and re-verification upon detection of non-desirable test and verification results during a test iteration.

14. The method of claim 13, further comprising converting a final fully tested and verified iterative version of the proposed prototype integrated circuit into a final mass production version as a fully integrated mixed signal System on Chip Integrated Circuit.

15. The method of claim 8, further comprising forming the digital IP portion from two or more sub-portions implemented on different ones of at least two discrete programmable digital integrated circuits.

* * * * *